United States Patent
Fredriksson et al.

(10) Patent No.: US 11,762,453 B2
(45) Date of Patent: Sep. 19, 2023

(54) METHOD PERFORMED BY A COMPUTER SYSTEM FOR CREATION OF AUGMENTED REALITY EXPERIENCES AND CONNECTION OF THESE TO THE REAL WORLD

(71) Applicant: Nagoon AB, Stockholm (SE)

(72) Inventors: Morgan Fredriksson, Stockholm (SE); Jürgen Königsmann, Gustavsberg (SE)

( * ) Notice: Subject to any disclaimer, the term of this patent is extended or adjusted under 35 U.S.C. 154(b) by 0 days.

(21) Appl. No.: 17/399,389

(22) Filed: Aug. 11, 2021

(65) Prior Publication Data
US 2022/0050519 A1    Feb. 17, 2022

(30) Foreign Application Priority Data

Aug. 13, 2020    (SE) .................................... 2030252-7

(51) Int. Cl.
*G06F 3/00* (2006.01)
*G06F 3/01* (2006.01)
(Continued)

(52) U.S. Cl.
CPC .............. *G06F 3/011* (2013.01); *G06F 16/29* (2019.01); *G06F 16/444* (2019.01); *G06T 19/006* (2013.01)

(58) Field of Classification Search
CPC ........ G06F 3/011; G06F 16/29; G06F 16/444; G06F 3/048; G06T 19/006; G06V 20/20; G06V 20/70; G06V 10/462
See application file for complete search history.

(56) References Cited

U.S. PATENT DOCUMENTS 9,345,957 B2 *   5/2016   Geisner ................... A63F 13/21
10,403,050 B1 *   9/2019   Beall .................... G02B 27/017
(Continued)

FOREIGN PATENT DOCUMENTS

| CN | 110285818 A | 9/2019 |
|---|---|---|
| WO | 2017031246 A1 | 2/2017 |
| WO | 2019079826 A1 | 4/2019 |

OTHER PUBLICATIONS

Jänicke, H., & Chen, M. (Jun. 2010). A salience-based quality metric for visualization. In Computer graphics forum (vol. 29, No. 3, pp. 1183-1192). Oxford, UK: Blackwell Publishing Ltd.*
(Continued)

*Primary Examiner* — Sarah Lhymn
(74) *Attorney, Agent, or Firm* — Haukaas Fortius PLLC; Michael Haukaas (57) ABSTRACT

Method performed by a computer system (1). The computer system (1) is arranged to communicate with a first database (2a). The method comprising the steps of: A. Receiving descriptive data (3) of a first object (4) from a first client (5). B. Receiving a physical position (6a) of a positioning device (7). C. Retrieving from the first database (2a) a data set (8) of a first nearby object (9) having a physical position (6b). D. Creating a description of the surrounding environment (11). E. Deleting redundant sub data (8a) of the retrieved data set (8) creating an optimised sub data (8b). F. Retrieving saliency data (13) being related to the first nearby object (9) from the first database (2a). G. Calculating a stand-out ratio (14) for the first nearby object (9) based on the saliency data (13). H. Creating a final description of the surrounding environment (15).

11 Claims, 8 Drawing Sheets

(51) Int. Cl.
   *G06F 16/44* (2019.01)
   *G06F 16/29* (2019.01)
   *G06T 19/00* (2011.01)

(56) References Cited

U.S. PATENT DOCUMENTS

| | | | |
|---|---|---|---|
| 2011/0050732 A1 | 3/2011 | Arrasvuori | |
| 2013/0147837 A1 | 6/2013 | Stroila | |
| 2014/0136726 A1* | 5/2014 | Van Wie | A63F 13/12 709/231 |
| 2016/0026253 A1* | 1/2016 | Bradski | H04N 13/128 345/8 |
| 2016/0133054 A1 | 5/2016 | Honjo et al. | |
| 2016/0366326 A1* | 12/2016 | Sen | H04N 5/23254 |
| 2017/0068323 A1* | 3/2017 | West | G06F 3/04815 |
| 2017/0364752 A1 | 12/2017 | Zhou et al. | |
| 2018/0061139 A1* | 3/2018 | Rodriguez | G02B 27/017 |
| 2018/0302590 A1 | 10/2018 | Kuzyakov et al. | |
| 2019/0051014 A1* | 2/2019 | Kahle | G06T 7/13 |
| 2019/0102939 A1* | 4/2019 | He | A63F 13/355 |
| 2020/0051336 A1* | 2/2020 | Ichikawa | G06T 19/006 |
| 2020/0090407 A1 | 3/2020 | Miranda et al. | |
| 2020/0111255 A1* | 4/2020 | Brodsky | G06F 3/0346 |
| 2020/0335001 A1* | 10/2020 | Freiwirth | H04L 67/131 |
| 2020/0401593 A1* | 12/2020 | Panuganty | G06F 9/4881 |
| 2021/0104100 A1* | 4/2021 | Whitney | G02B 27/0172 |
| 2021/0173887 A1* | 6/2021 | Petersen | G06F 16/29 |

OTHER PUBLICATIONS

Extended Search Report and Written Opinion of the European Patent Office dated Jan. 25, 2022 in EP Application No. 21190925.4 (EP3955094A2); 12pgs.
Liu et al., "Locally Refined Collision Detection of Large Scale Complex Polygonal Meshes in Distributed Virtual Environments", 2006 IEEE International Conference on Multimedia and Expo, 2006, pp. 209-212, doi: 10.1109/ICME.2006.262419.

* cited by examiner

METHOD PERFORMED BY A COMPUTER SYSTEM FOR CREATION OF AUGMENTED REALITY EXPERIENCES AND CONNECTION OF THESE TO THE REAL WORLD

RELATED APPLICATIONS

This application claims priority under 35 U.S.C. § 119(a) to Swedish Patent Application No. 2030252-7 filed Aug. 13, 2020, which application is incorporated herein by reference.

TECHNICAL FIELD

The present invention relates to a method performed by a computer system for creation of augmented reality experiences and connection of these to the real world.

BACKGROUND

Augmented reality (AR) is an interactive experience of a real-world environment where the objects that reside in the real world are enhanced by computer-generated perceptual information. AR can be defined as a system that fulfils three basic features: a combination of real and virtual worlds, real-time interaction, and accurate 3D registration of virtual and real objects. The overlaid sensory information can be constructive (i.e. additive to the natural environment), or destructive (i.e. masking of the natural environment). Augmented reality is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world.

Computer systems for handling augmented reality (AR) have in the past been introduced on the market. These systems comprise different types of hardware devices interconnected to each other. There are many organisations trying to enhance these systems to provide improved value-added services.

The feedback loops retrieving and transmitting data between different parts of the computer system handling the AR experience are however not very well developed. If the computer system could handle augmented reality experiences and connect these to the real world, by using more advanced feedback loops retrieving and transmitting data between different parts of the computer system, it would be highly valuable.

It would be highly beneficial if data could be handled in a certain manner, that would make it possible to generate a value-added description of the surrounding environment. This would provide the end user with an enhanced and intelligent view of the environment.

Furthermore, it would also be beneficial if instructions could be managed and sent to different parts of the computer system so that an efficient interaction between different users and the surrounding environment could become viable.

Finally, it would be advantageous if the behaviour of different users or objects present in the surrounding environment could be registered and processed for providing a value-added service.

It is therefore desirable to accomplish a system, for creation of augmented reality experiences and connection of these to the real world, that generates a value-added description of the surrounding environment, that provides an efficient interaction between different users and the surrounding environment, and that manages the behaviour of different users or objects present in the surrounding environment.

SUMMARY OF INVENTION

An objective of the present invention is thus to accomplish a method performed by a computer system for creation of augmented reality experiences and connection of these to the real world, that generates a value-added description of the surrounding environment, that provides an efficient interaction between different users and the surrounding environment, and that manages the behaviour of different users or objects present in the surrounding environment.

According to one aspect, the invention concerns a method performed by a computer system for creation of augmented reality experiences and connection of these to the real world. The computer system is arranged to communicate with a first database. The method comprising the steps of: A. receiving descriptive data of a first object from a first client, B. receiving a physical position of a positioning device being external to and in close proximity to or internal the first object, C. retrieving from the first database a data set of a first nearby object having a physical position being related to the physical position of the positioning device, D. creating a description of the surrounding environment by combining: the retrieved data set of the first nearby object with the descriptive data of the first object, the physical position of the positioning device, and the physical position of the first nearby object, E. deleting redundant sub data of the retrieved data set of the first nearby object creating an optimised sub data, F. retrieving saliency data being related to the first nearby object from the first database, G. calculating a stand-out ratio for the first nearby object based on the saliency data, and H. creating a final description of the surrounding environment based on the descriptive data of the first object, the physical position of the positioning device, the optimised sub data, the stand-out ratio for the first nearby object, and the physical position of the first nearby object, for providing the description of the surrounding environment to e.g. a user of the computer system. The user may make better decisions on various matters based upon the provided description of the surrounding environment.

An advantage of the solution, is that it handles and improves augmented reality experiences and connects these to the real world. Furthermore, it specifically generates in an intelligent manner a value-added description of the surrounding environment based upon retrieved and processed information/data.

The method above may be configured according to different optional embodiments. For example, wherein the method may further comprise the steps of: A. retrieving a first instruction from the optimised sub data, and B. sending the first instruction to the first client for triggering an activity of the first object, or C. sending the first instruction to a second client for triggering an activity of a second object, wherein the second object being related to the first object, or D. sending the first instruction to a third client for triggering an activity of the first nearby object, or E. sending the first instruction to a fourth client for triggering an activity of a second nearby object, wherein the second nearby object being related to the first nearby object.

An advantage of the solution, is that it provides the possibility to send specific instructions to the first or the second object or to the first or the second nearby object. The first or the second object being e.g. a human/humans/a vehicle/vehicles using the system The first or the second nearby object being e.g. a building or any other object found in the surrounding environment. Furthermore, it provides the possibility to trigger corresponding activities of the first or the second object or of the first or the second nearby object. In this manner interesting interactions between the system and e.g. real humans/vehicles using it and/or nearby objects found in the real world could occur. These interactions are based upon the provided value-added descriptions of the surrounding environment.

According to an embodiment of the invention wherein the method may further comprise the step of illustrating the final description of the surrounding environment on a user interface of the first client.

An advantage of the solution, is that it generates a value-added description of the surrounding environment and specifically depicts it on a user interface.

According to an embodiment of the invention wherein the method may further comprise receiving a first behavioural data set of the first object from the first client by means of a first behavioural device being external to and in close proximity to or internal the first object. The method may further comprise receiving a second behavioural data set of the second object from the second client by means of a second behavioural device being external to and in close proximity to or internal the second object.

An advantage of the solution, is that a behavioural device could collect information/data about for instance the real world activities of a first and a second object being e.g. a human/humans or a vehicle/vehicles using the system.

According to an embodiment of the invention wherein the method may further comprise the steps of: A. retrieving a second instruction from the optimised sub data as a response of the received first and second behavioural data set of the first and the second object, and B. sending the second instruction to the first client for triggering an activity of the first object, or C. sending the second instruction to the second client for triggering an activity of the second object, wherein the second object being related to the first object, or D. sending the second instruction to the third client for triggering an activity of the first nearby object, or E. sending the second instruction to the fourth client for triggering an activity of a second nearby object, wherein the second nearby object being related to the first nearby object.

An advantage of the solution, is that it provides the possibility to send specific instructions to the first or the second object or to the first or the second nearby object. The first or the second object being e.g. a human/humans/a vehicle/vehicles using the system The first or the second nearby object being e.g. a building or any other object found in the surrounding environment. These instructions are partly being based upon information/data collected by the first and the second behavioural device about for instance the real-world activities of the first and the second object. Furthermore, it provides the possibility to trigger corresponding activities of the first or the second object or of the first or the second nearby object. In this manner even more interesting interactions between the system and e.g. real humans/vehicles using it and/or nearby objects found in the real world could occur. These interactions are also based upon the provided value-added descriptions of the surrounding environment.

According to an embodiment of the invention wherein the method may further comprise the step of receiving additional data of the first and the second object by means of an external device.

An advantage of the solution, is that it provides additional possibilities to gather information of the real-world activities of the first and the second object. It could specifically generate in an intelligent manner an ever more value-added description of the surrounding environment based upon retrieved and processed information/data. It could also even better illustrate the final description of the surrounding environment on a user interface. It could also even better provide the possibility to send specific instructions to the first or the second object or to the first or the second nearby object. The first or the second object being e.g. a human/humans/a vehicle/vehicles using the system The first or the second nearby object being e.g. a building or any other object found in the surrounding environment. These instructions are partly being based upon information/data collected by the external device and possibly also the first and the second behavioural device about for instance the real-world activities of the first and the second object. Furthermore, it provides the possibility to trigger corresponding activities of the first or the second object or of the first or the second nearby object. In this manner even more interesting interactions between the system and e.g. real humans/vehicles using it and/or nearby objects found in the real world could occur. These interactions are also based upon the provided value-added descriptions of the surrounding environment.

According to an embodiment of the invention wherein the computer system is also arranged to communicate with a second database. The retrieving a data set step may comprise retrieving a first data set of the first and the second nearby object from the first database based upon the physical position of the positioning device, and retrieving a second data set of the first and the second nearby object from the second database based upon the physical position of the positioning device.

An advantage of the solution, is that several independent databases, also externally found, could be used to provide data/information of the first and the second nearby object being e.g. buildings or any other objects found in the surrounding environment According to an embodiment of the invention wherein the deleting redundant sub data step is conducted by using an optimisation algorithm.

An advantage of the solution, is that it generates in an even more efficient manner an intelligent and value-added description of the surrounding environment based upon retrieved and processed information/data.

According to a second aspect, the invention concerns a computer system for creation of augmented reality experiences and connection of these to the real world. The computer system is arranged to communicate with a first database and is arranged to: A. receive descriptive data of a first object from a first client, B. receive a physical position of a positioning device being external to and in close proximity to or internal the first object, C. retrieve from the first database a data set of a first nearby object having a physical position being related to the physical position of the positioning device, D. create a description of the surrounding environment by combining: the retrieved data set of the first nearby object with the descriptive data of the first object, the physical position of the positioning device, and the physical position of the first nearby object, E. delete redundant sub data of the retrieved data set of the first nearby object using an optimisation algorithm creating an optimised sub data, F. retrieve saliency data being related to the first nearby object from the first database, G. calculate a stand-out ratio for the first nearby object based on the saliency data, and H. create a final description of the surrounding environment based on the descriptive data of the first object, the physical position of the positioning device, the optimised sub data, the stand-out ratio for the first nearby object, and the physical position of the first nearby object, for providing the description of the surrounding environment to e.g. a user of the computer system. The user may make better decisions on various matters based upon the provided description of the surrounding environment.

An advantage of the solution, is that the computer system handles and improves augmented reality experiences and connects these to the real world. Furthermore, it specifically generates in an intelligent manner a value-added description of the surrounding environment based upon retrieved and processed information/data.

According to a third aspect, the invention concerns a computer program, comprising computer readable code means, which when run on a computer system causes the computer system to perform the corresponding method.

According to a fourth aspect, the invention concerns a computer program product, comprising a computer readable medium and a computer program, wherein the computer program is stored on the computer readable medium.

The physical positions could be positions outdoors or indoors.

An activity of a first and a second object could for instance be two humans being triggered to look at a specific part of a building for an interesting architectural item. An activity of a first and a second nearby object could for instance be these buildings providing specific information, on e.g. digital billboards, to two specific humans being in close proximity to these buildings.

The description of the surrounding environment is a conceptual and dynamic model, which provides information of the interrelations between all nearby objects.

The user interface could for instance, among others, be a monitor delivering an image/video or a loudspeaker delivering a voice message.

The first and the second object could for instance, among others, be a person or a vehicle.

The first and the second nearby object could for instance, among others, be a house, a bridge, a road, or a human being.

The behavioural device could for instance, among others, be a motion sensor or a VR headset.

The external device could for instance, among others, be a video camera.

The optimisation algorithm could for instance be a geometric optimisation model, among others. Furthermore, a collision mesh method is an example of a geometric optimisation model which could be used as an optimisation algorithm in this invention.

The descriptive data of an object can, among others, be metadata with regards to the object as well as data describing a feature of the object. Metadata is data that provides information about other data. A feature of the object can e.g. be a feature that can be perceived by another physical being or object.

The first and the second databases mentioned may be external or internal of the computer system.

That the physical position of a nearby object having an association with the physical position of a positioning device, may imply that the positions are physically close to each other. However, other associations may also occur.

The user of the computer system being a human may be equivalent to the first object. The user being a human could also be managing the first object, wherein the first object could be e.g. a vehicle.

The deleting of redundant sub data of the retrieved data set of the first nearby object, could for instance imply that all data of the parts of e.g. a building, being the first nearby object, which the first object, for instance a human being, does not visually see in the real world is deleted. This data to be deleted could for instance be all data representing the back of the building and the internal parts of the building, leaving only the data representing the building which is visually seen by the human being.

An example of the method is here provided. A. Receiving descriptive data of a first object from a first client, may imply that a description of a human being is sent from the smartphone belonging to the human, and received by the system. B. Receiving a physical position of the positioning device being external to and in close proximity to or internal the first object, may imply that the XYX coordinates of the smartphone are collected by a GPS device being embedded in the smartphone and further sent to the system by the smartphone. The human being the holder of the smartphone. The XYZ coordinates of the smartphone further being received by the system. C. Retrieving from the first database a data set of a first nearby object having a physical position being related to the physical position of the positioning device, may imply that a data set is retrieved comprising technical characteristics of a building, defined as the nearby object. The building having XYZ coordinates rather close to the XYZ coordinates of the smartphone of the human being. D. Creating a description of the surrounding environment by combining: the retrieved data set of the first nearby object with the descriptive data of the first object, the physical position of the positioning device, and the physical position of the first nearby object, may imply that a thorough description of the surrounding environment is compiled by the technical characteristics of the building, the description of the human being, the XYZ coordinates of the smartphone i.e. the human being which is the holder of the smartphone and the XYZ coordinates of the building. E. Deleting redundant sub data of the retrieved data set of the first nearby object using an optimisation algorithm creating an optimised sub data, may imply that a collision mesh method is used to decrease the number om data points within the data set needed to illustrate the building. F. Retrieving saliency data being related to the first nearby object from the first database, may imply that the system receives data of how large portion the building represents of the total line-of-sight-view for the human being and how much more the building should be highlighted in addition for the user, based upon e.g. colour of the building, height of the building etc. Saliency data may be characteristic data of the first nearby object. Saliency data may be descriptive data of the first nearby object. Saliency data may be objective data of the first nearby object. Saliency data may comprise the colour of the first nearby object. Saliency data may comprise the width of the first nearby object. Saliency data may comprise the height of the first nearby object, among other data descriptive of the first nearby object. G. Calculating a stand-out ratio for the first nearby object based on the saliency data, may imply that the stand-out ratio for the building, i.e. how much the building relatively should stand out in an overall illustration of the surrounding environment, is calculated based upon of how large portion the building represents of the total line-of-sight-view for the human being and how much more the building should be highlighted in addition for the user, based upon e.g. colour of the building, height of the building etc. H. Creating a final description of the surrounding environment based on the descriptive data of the first object, the physical position of the positioning device, the optimised sub data, the stand-out ratio for the first nearby object, and the physical position of the first nearby object, may imply that an illustration of the surrounding environment is created based upon the description of the human being, the XYZ coordinates of the smartphone held by the human being, the optimised number of data points for illustrating the building, and the XYZ coordinates of the building.

The general conditions of the method are the following: The user/object does not need to be real; Mixing real objects, found in the real world, and non-real objects, in the software model is feasible; There may be a plurality of users/objects in the same world, controlled by the system, that may interact; The clients can also serve as servers, i.e. manage other clients and create their own environments. The clients/servers may communicate with each other; The system can run in off-line mode without own direct access to mobile data by transferring data instead via wifi, bluetooth etc. This could be a preferable solution during a crisis, in the mining industry, and in non-connected systems such as in the defence sector etc.; The GPU, on the graphics card or elsewhere, may work with a lot of the real-time calculations.

Figure 8:
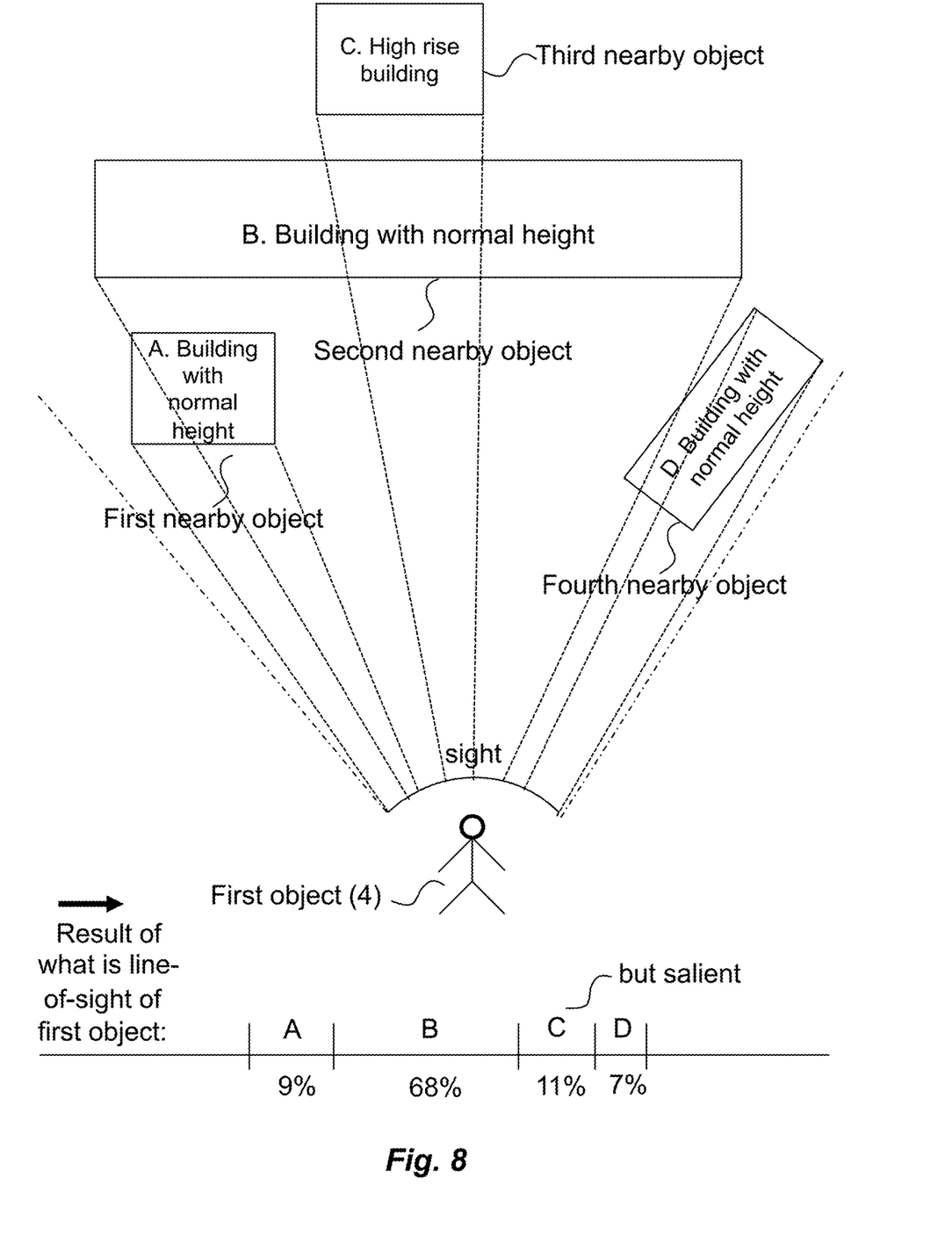
FIG. 8 is a block diagram illustrating a line-of-sight model, according to a possible embodiment.

The method in the software solution may be described by the following six steps: 1. The server/computer system receives any type of position of an object, an individual or a physical object, e.g. a car, a robot, from the positioning device for instance via the client. This position could be provided by for instance a GPS, beacon: indoor/outdoor, or wifi technology, etc. Also, other types of external devices, such as cameras for instance, could be used to receive/extract data around and with regards to the object, and subsequently transmit the information to the computer system. This can also be conducted in a virtual reality setting. 2. The server/computer system downloads basic data around the object with regards to the given position. This data is for example sourced from:—databases such as Esri (GIS), Streetmap (GIS), Bisnode (business data) etc. or from— local data sources, e.g. point clouds—a large number of coordinates in 3D), or from—Building Information Modeling (BIM) data (3D data). This step implies population of data. Additional data, that is applicable to the nearby objects, is thus sourced from databases and added and to the nearby objects or to the object itself. This resembles of how layers are created in CAD environments. A data model has now been created. Remark: Step 2 may be conducted before step 1, and/or the data in step 2 can already be found on the server/computer system. 3. Swiftly create an image of the surrounding environment by populating the description of the surrounding environment with nearby objects such as roads, houses, stores, etc. The nearby objects are dynamic. However, this description of the surrounding environment may not be made visible to the end user. This is comparable to a 3D engine, but with data that is not visible. 4. Optimise basic data, i.e. information is deleted. This is done e.g. by a "collision mesh" method, which results in a less complicated image of the object. Data is simplified, and retains only what is in "line-of-sight". A real-time analysis of what an object or user would see is conducted. A calculation is conducted of what an object or a user sees and which objects in the environment that should stand out, i.e. which objects are salient and which are not. If something stands out in a very obvious way, it can be called salient. For instance, a high-rise building should be listed as salient, even though it only represents a small percentage of pixels in an image. A proprietary technology is used for this. FIG. 8 illustrates how large percentage specific objects (A-D) would represent in a line-of-sight view for an object or user at a specific geographical position. Remark: C should be made salient for the object or end user, as it is a high-rise building. This even though C only represents 12% of the total line-of-sight. 5. Track an individual's/an object's behaviour in the environment, e.g.: —how fast an object or individual moves (fast paced running, slow walking). This can be achieved by using sensors in a mobile phone. —what the object or person is looking at. This can be achieved by using a 3D compass in a headset, Google Glass, HTC Vive etc. 6. The system may in this step start to interact with the object or user. Now, the object or user is suddenly a part of the environment/computer model. I.e. the user/object in the virtual environment is consistent with the user/object in the real environment. The system can for instance start influencing the person or object to look at or approach different specific nearby objects.

BRIEF DESCRIPTION OF DRAWINGS

The invention is now described, by way of example, with reference to the accompanying drawings, in which.

DESCRIPTION OF EMBODIMENTS

In the following, a detailed description of a method performed by a computer system for creation of augmented reality experiences and connection of these to the real world is provided.

Figure 1:
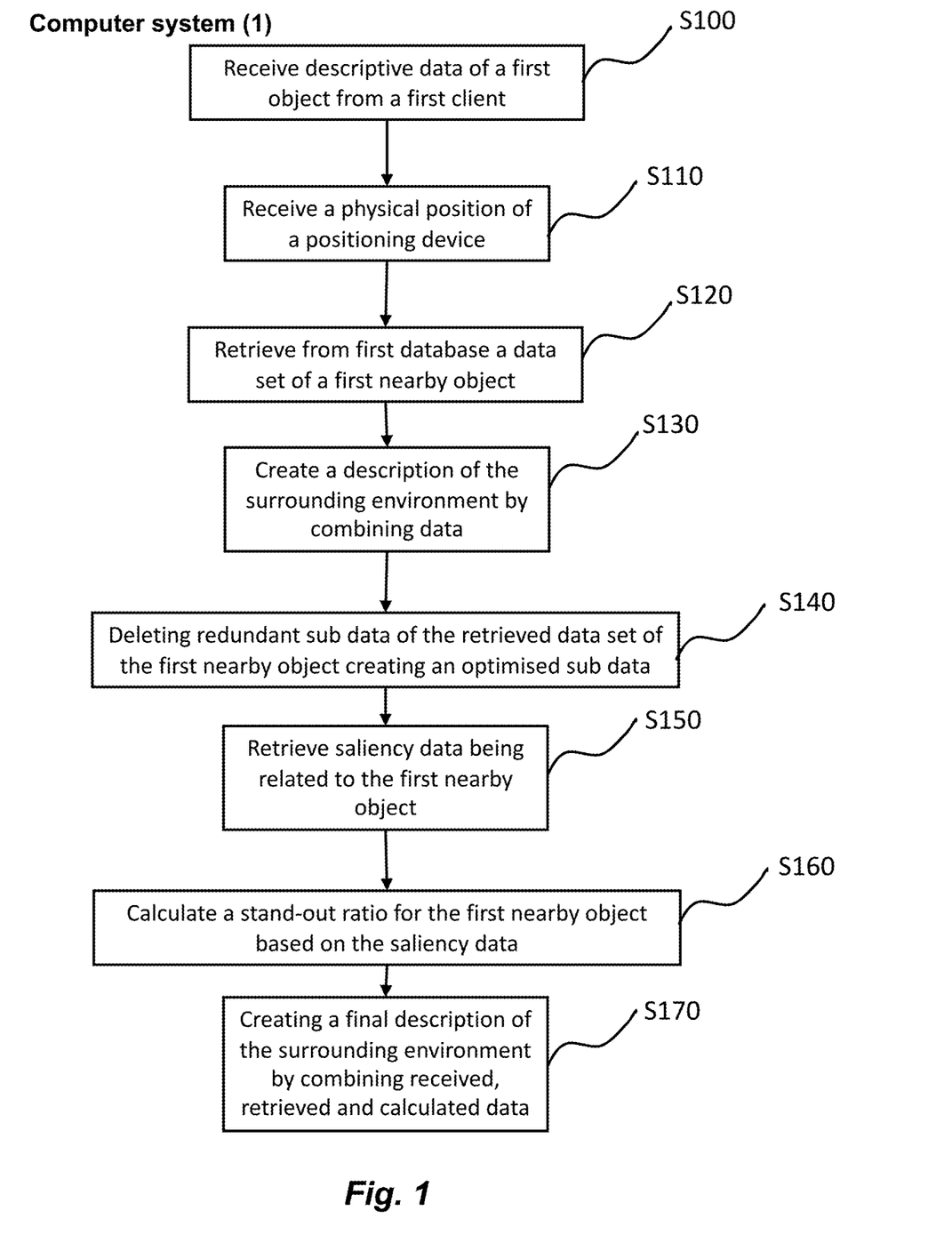
FIG. 1 is a flow chart of a procedure according to an embodiment.

FIG. 1 shows a flow chart illustrating a procedure in a computer system. The various actions may come in different orders than presented in this description, or in a different order than shown in this or other flowcharts related to this description, or some steps may be performed in parallel.

In a step S100 descriptive data 3 of a first object 4 is received from a first client 5 at the computer system 1. In a step S110 a physical position 6*a* of a positioning device 7 being external to and in close proximity to or internal the first object 4, is received at the computer system 1. In a step S120 a data set 8 of a first nearby object 9 having a physical position 6*b* being related to the physical position 6*a* of the positioning device 7 is retrieved from the first database 2*a*. In a step S130 a description of the surrounding environment 11 is created at the computer system 1 by combining: the retrieved data set 8 of the first nearby object 9 with the descriptive data 3 of the first object 4, the physical position 6*a* of the positioning device 7, and the physical position 6*b* of the first nearby object 9. In a step S140 redundant sub data 8*a* of the retrieved data set 8 of the first nearby object 9 is deleted creating an optimised sub data 8*b*. In a step S150 saliency data 13 being related to the first nearby object 9 is retrieved from the first database 2a. In a step S160 a stand-out ratio 14 for the first nearby object 9 is calculated based on the saliency data 13. In a step S170 a final description of the surrounding environment 15 is created based on the descriptive data 3 of the first object 4, the physical position 6a of the positioning device 7, the optimised sub data 8b, the stand-out ratio 14 for the first nearby object 9, and the physical position 6b of the first nearby object 9.

Figure 2:
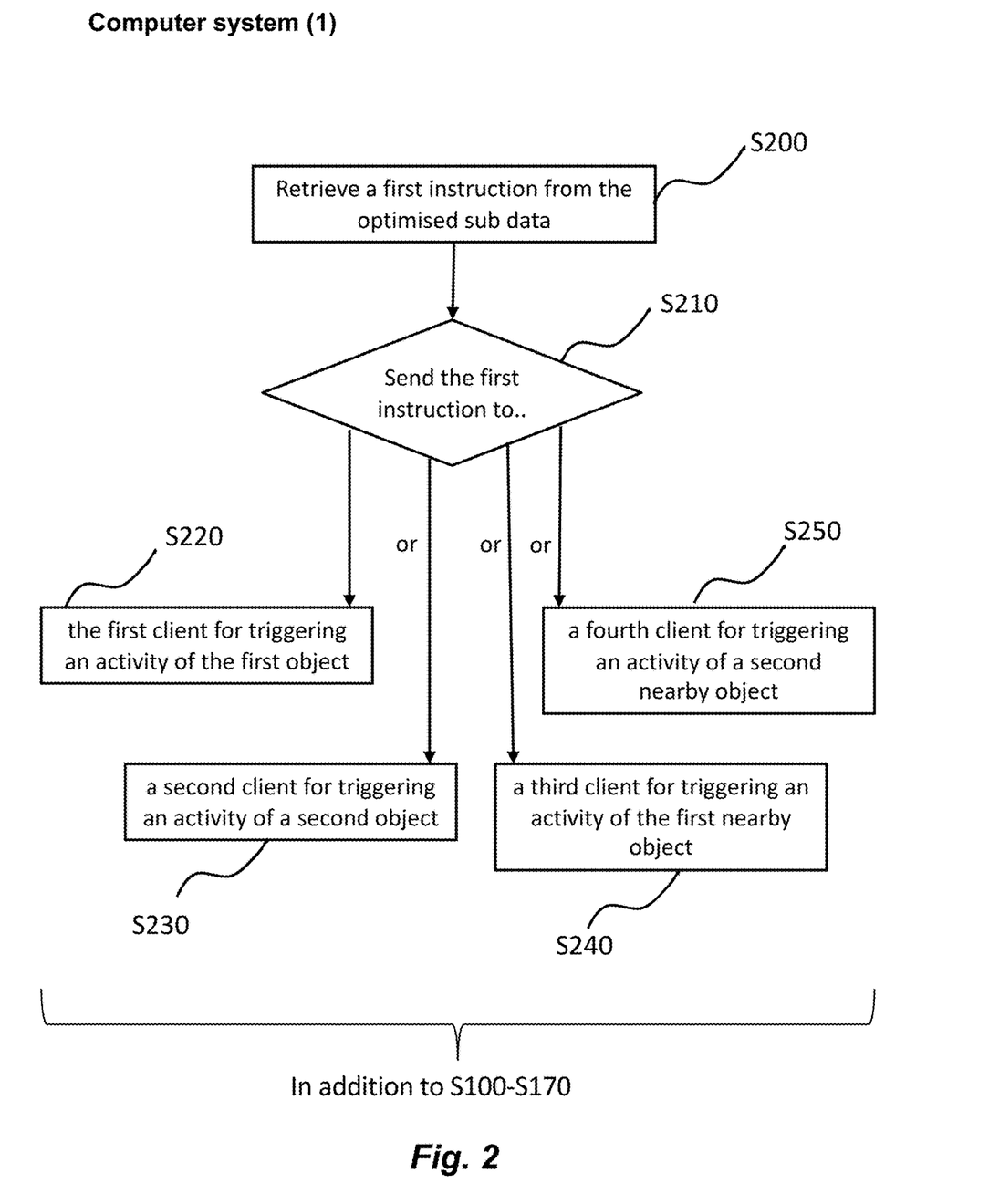
FIG. 2 is a flow chart of a procedure according to an embodiment.

FIG. 2 shows a flow chart illustrating a procedure in a computer system. The various actions may come in different orders than presented in this description, or in a different order than shown in this or other flowcharts related to this description, or some steps may be performed in parallel.

In a step S200 a first instruction 16 is retrieved from the optimised sub data 8b. In a step S210/S220 the first instruction 16 is sent to the first client 5 for triggering an activity 17 of the first object 4. In a step S210/S230 the first instruction 16 is sent to a second client 18 for triggering an activity 19 of a second object 20, wherein the second object 20 being related to the first object 4. In a step S210/S240 the first instruction 16 is sent to a third client 21 for triggering an activity 22 of the first nearby object 9. In a step S210/S250 the first instruction 16 is sent to a fourth client 23 for triggering an activity 24 of a second nearby object 25, wherein the second nearby object 25 being related to the first nearby object 9.

Figure 3:
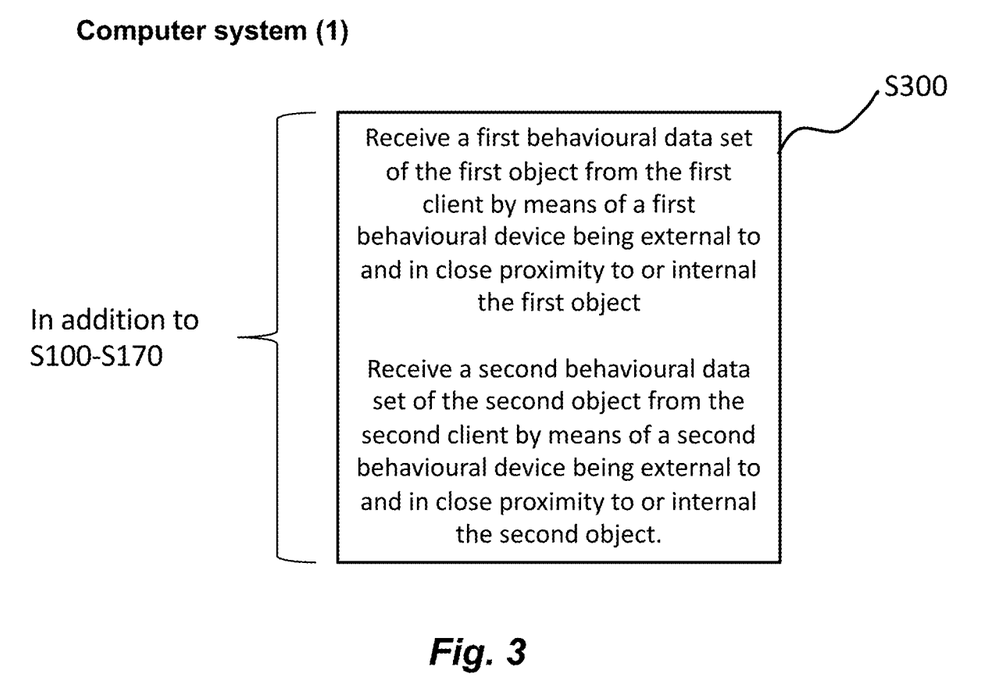
FIG. 3 is a flow chart of a procedure according to an embodiment.

FIG. 3 shows a flow chart illustrating a procedure in a computer system. The various actions may come in different orders than presented in this description, or in a different order than shown in this or other flowcharts related to this description, or some steps may be performed in parallel.

In a step S300 a first behavioural data set 27a of the first object 4 is received from the first client 5 by means of a first behavioural device 28a being external to and in close proximity to or internal the first object 4, and a second behavioural data set 27b of the second object 20 is received from the second client 18 by means of a second behavioural device 28b being external to and in close proximity to or internal the second object 20.

Figure 4:
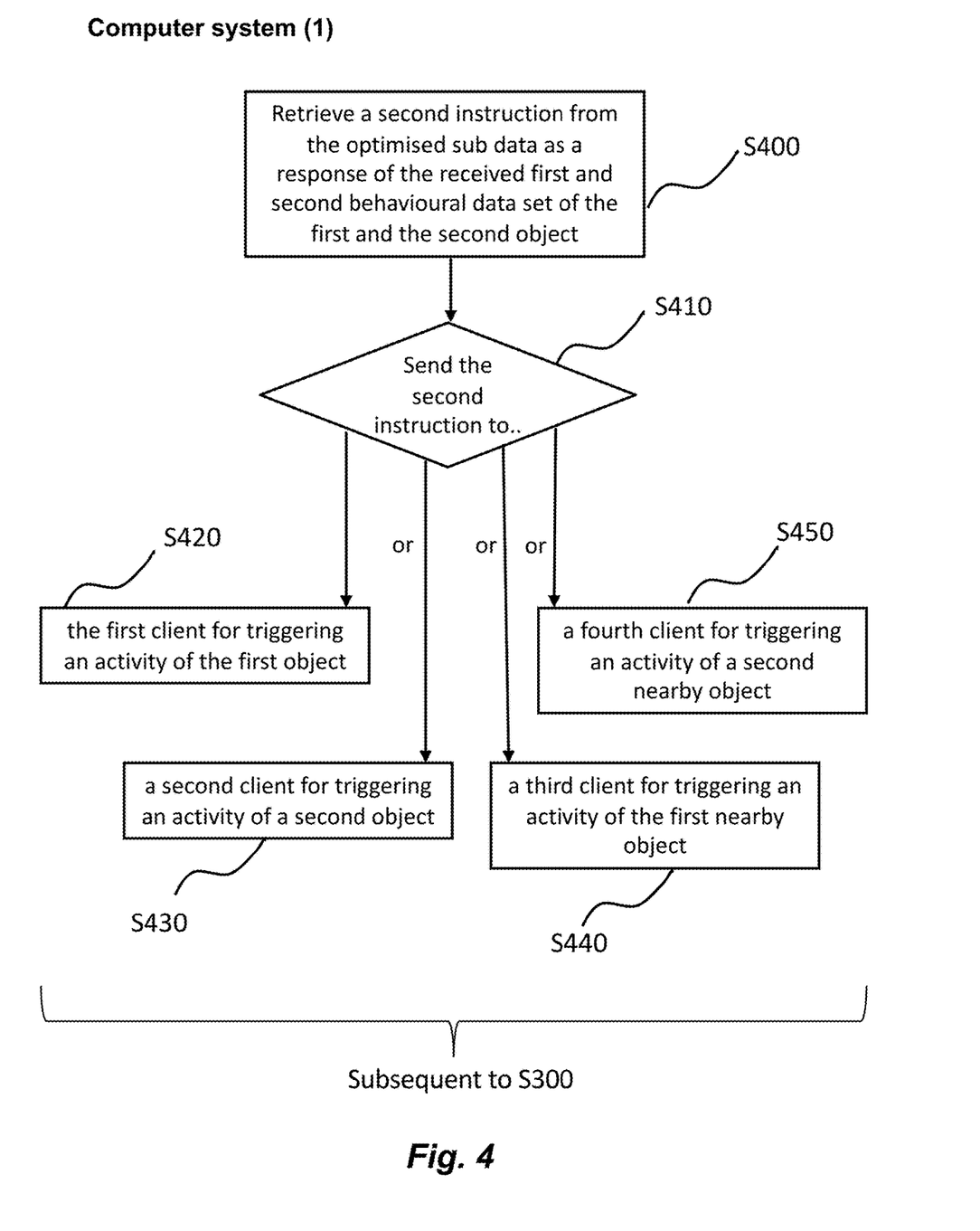
FIG. 4 is a flow chart of a procedure according to an embodiment.

FIG. 4 shows a flow chart illustrating a procedure in a computer system. The various actions may come in different orders than presented in this description, or in a different order than shown in this or other flowcharts related to this description, or some steps may be performed in parallel.

In a step S400 a second instruction 29 from the optimised sub data 8b is retrieved as a response of the received first and second behavioural data set 27a, 27b of the first and the second object 4, 20. In a step S410/S420 the second instruction 29 is sent to the first client 5 for triggering an activity 17 of the first object 4. In a step S410/S430 the second instruction 29 is sent to the second client 18 for triggering an activity 19 of the second object 20, wherein the second object 20 being related to the first object 4. In a step S410/S440 the second instruction 29 is sent to the third client 21 for triggering an activity 22 of the first nearby object 9. In a step S410/S450 the second instruction 29 is sent to the fourth client 23 for triggering an activity 22 of a second nearby object 25, wherein the second nearby object 25 being related to the first nearby object 9.

Figure 5:
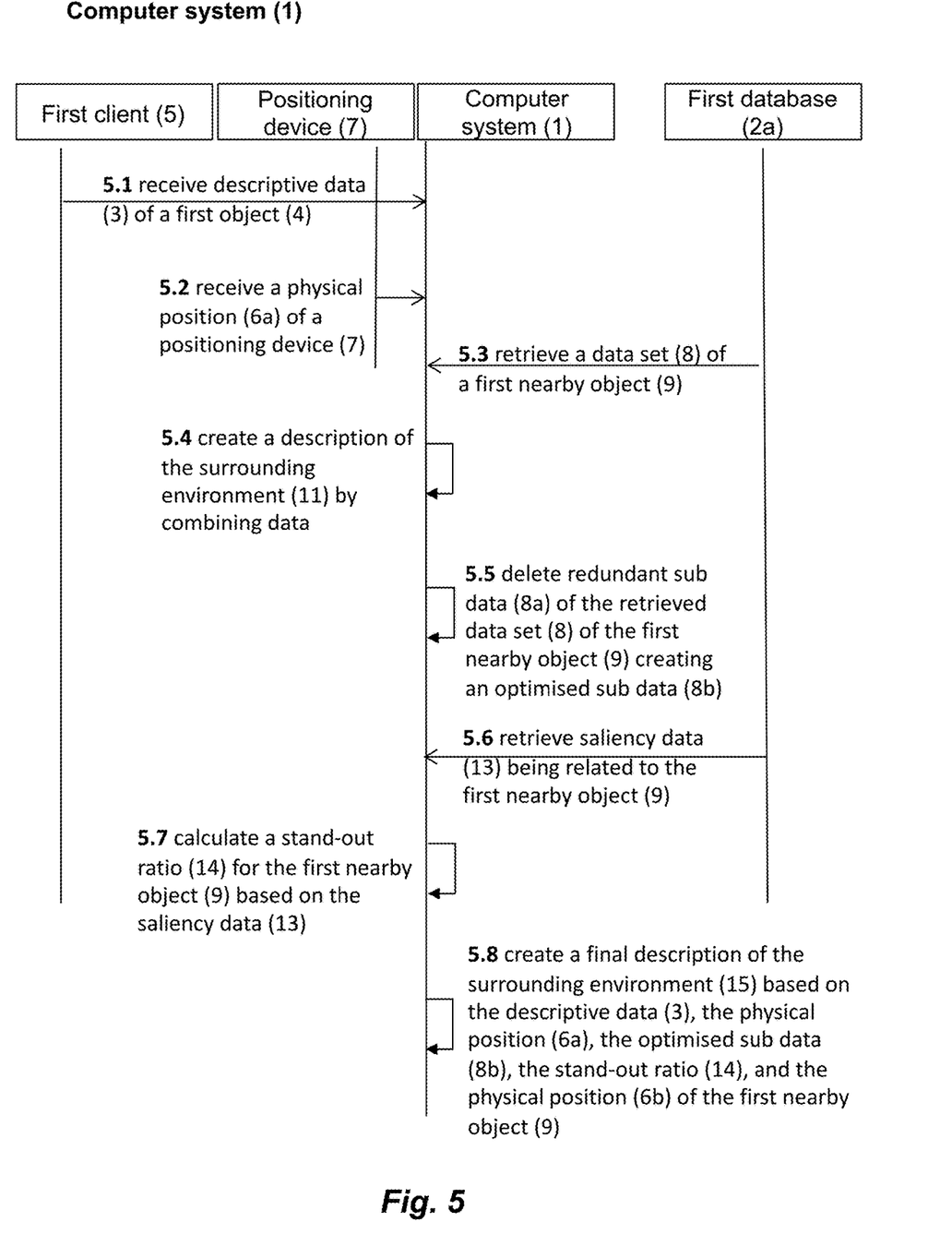
FIG. 5 is a flow chart of a procedure according to an embodiment.

FIG. 5 shows a flow chart illustrating a procedure in a computer system. The various actions may come in different orders than presented in this description, or in a different order than shown in this or other flowcharts related to this description, or some steps may be performed in parallel.

In a step 5.1 descriptive data 3 of a first object 4 is received from a first client 5 at the computer system 1. In a step 5.2 a physical position 6a of a positioning device 7 being external to and in close proximity to or internal the first object 4, is received at the computer system 1. In a step 5.3 data set 8 of a first nearby object 9 having a physical position 6b being related to the physical position 6a of the positioning device 7 is retrieved from the first database 2a. In a step 5.4 a description of the surrounding environment 11 is created at the computer system 1 by combining: the retrieved data set 8 of the first nearby object 9 with the descriptive data 3 of the first object 4, the physical position 6a of the positioning device 7, and the physical position 6b of the first nearby object 9. In a step 5.5 redundant sub data 8a of the retrieved data set 8 of the first nearby object 9 is deleted creating an optimised sub data 8b. In a step 5.6 saliency data 13 being related to the first nearby object 9 is retrieved from the first database 2a. In a step 5.7 a stand-out ratio 14 for the first nearby object 9 is calculated based on the saliency data 13. In a step 5.8 a final description of the surrounding environment 15 is created based on the descriptive data 3 of the first object 4, the physical position 6a of the positioning device 7, the optimised sub data 8b, the stand-out ratio 14 for the first nearby object 9, and the physical position 6b of the first nearby object 9.

Figure 6:
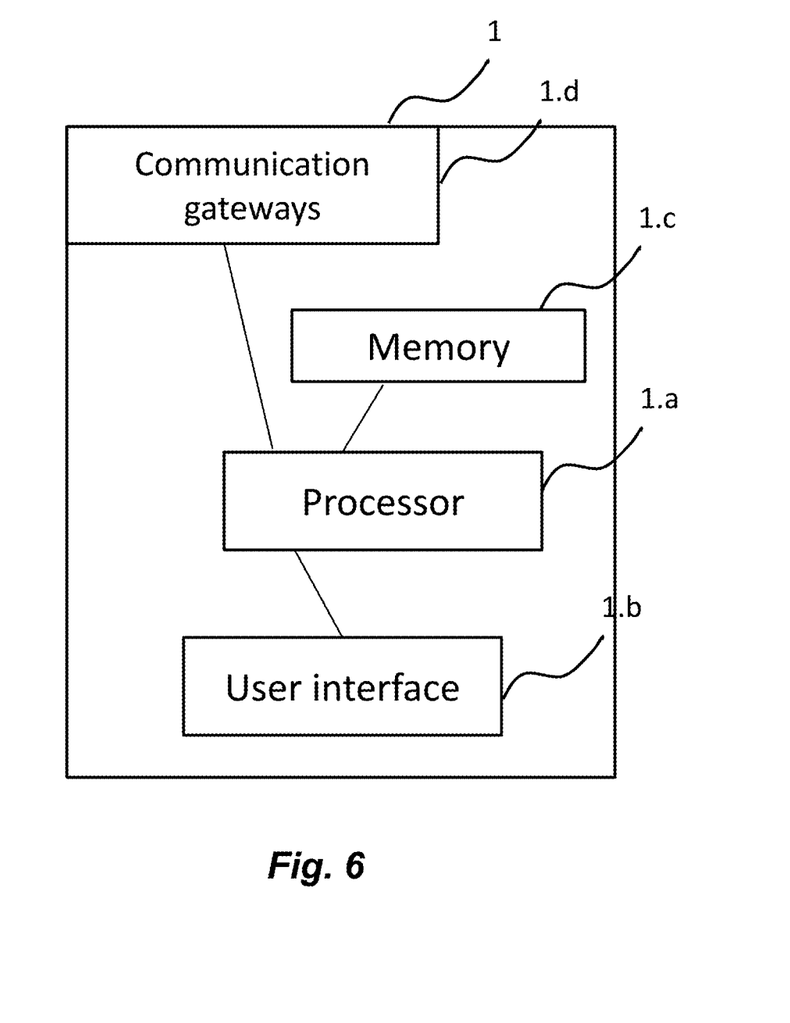
FIG. 6 is a block diagram illustrating a computer system, according to a possible embodiment.

FIG. 6 shows a computer 1, including components such as a processor 1.a, a user interface 1.b, a memory 1.c and communication gateways 1.d.

Figure 7:
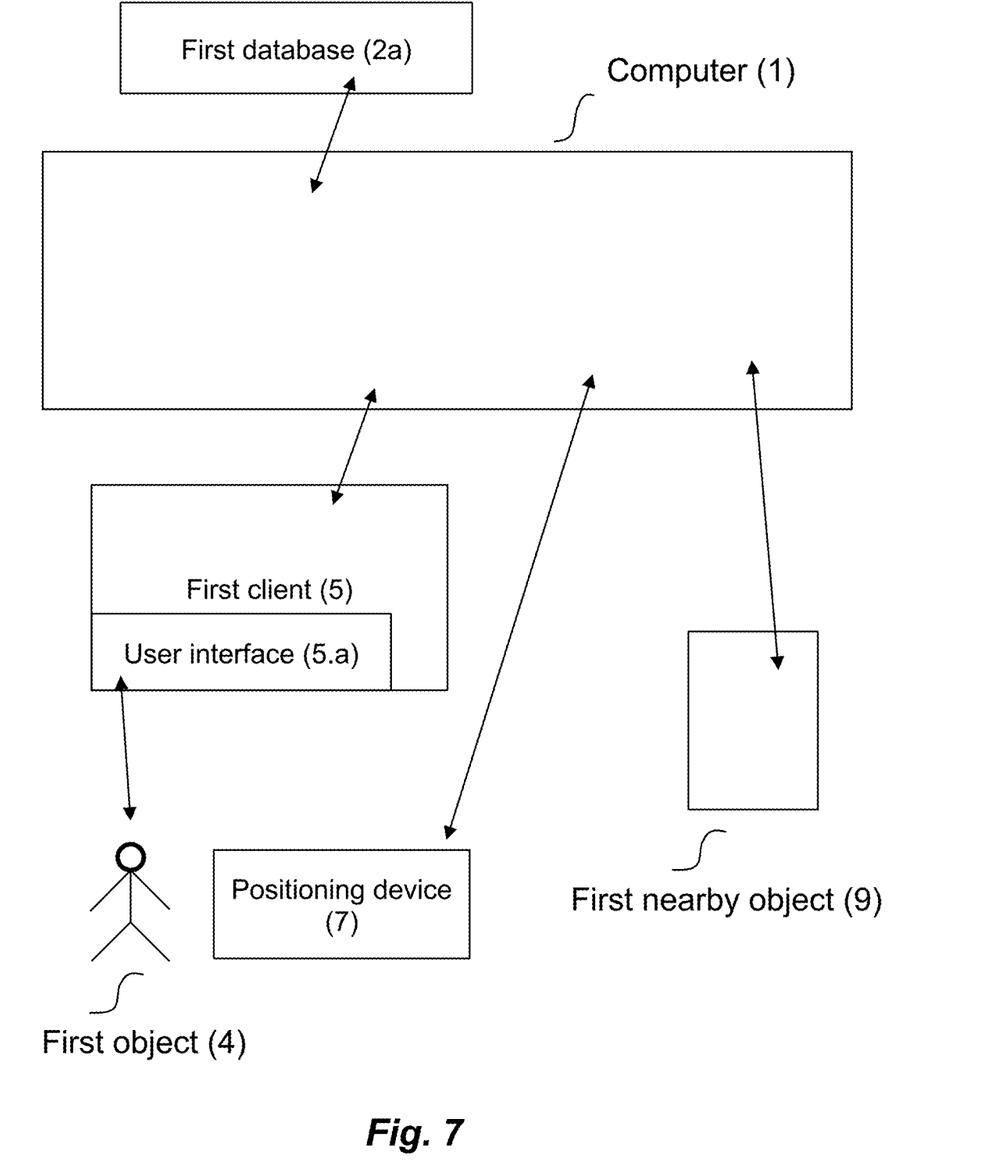
FIG. 7 is a block diagram illustrating a computer system in connection with other parts, according to a possible embodiment.

FIG. 7 shows a user interface 5.a of a first client 5 used by a first object 4, a positioning device 7, a first database 2a and a first nearby object 9. The first client 5, the positioning device 7, the first database 2a and the first nearby object 9 being connected to a computer 1.

FIG. 8 shows how a line-of-sight of a first object, in this case a human being, is modelled in general. The first, second, third and fourth nearby objects being buildings. The saliency data retrieved is used to calculate a stand-out ratio for each building. In this particular example, building C will have a stand-out ratio higher than its relative size, as it's a high-rise building compared to the other buildings being of normal height.

The invention claimed is:

1. Method performed by a computer system (1) for creation of augmented reality experiences and connection of these to the real world, wherein the computer system (1) is arranged to communicate with a first database (2a) comprising data on a surrounding environment (11), and communicate with a first client (5), and
wherein the data on the surrounding environment (11) comprises one or more of geographic data, building data, and map data, the method comprising the steps of:
A. receiving descriptive data (3) of a first object (4) from the first client (5), the descriptive data comprising metadata of the first object (4) and/or data describing a feature of the first object (4),
B. receiving a physical position (6a) of a location determining device (7) being external to and in close proximity to or internal of the first object (4),
C. retrieving from the first database (2a) a data set (8) of a first nearby object (9) having a physical position (6b) in the surrounding environment (11) wherein the data set is sourced from an application comprising one or more of a geographic information system (GIS), building information mapping (BIM), or business data (Bisnode),
D. creating a description of the surrounding environment (11) by combining: the retrieved data set (8) of the first nearby object (9) with the descriptive data (3) of the first object (4), the physical position (6a) retrieved by the location determining device (7), and the physical position (6b) of the first nearby object (9), E. deleting redundant sub data (8a) of the retrieved data set (8) of the first nearby object (9) creating an optimised sub data (8b) wherein the redundant sub data (8a) comprises all data of portions of the first nearby object (9) that the first object (4) does not visually observe in the real world, F. retrieving a dataset of saliency data (13) of the first nearby object (9) from the first database (2a), wherein the saliency data (13) comprises data related to physical features or rendering aspects of the first nearby object (9), G. calculating a stand-out ratio (14) for the first nearby object (9) based on the saliency data (13), wherein the stand-out ratio (14) is a value of how much the first nearby object (9) stands out in an overall illustration of the surrounding environment (11), and calculated based on the portion of the first nearby object (9) represents of the total line-of-sight-view, and H. creating a final description of the surrounding environment (15) based on the descriptive data (3) of the first object (4), the physical position (6a) of the location determining device (7), the optimised sub data (8b), the stand-out ratio (14) for the first nearby object (9), and the physical position (6b) of the first nearby object (9), for providing the description of the surrounding environment (15).

2. Method performed by a computer system (1) according to claim 1, wherein the method further comprises the steps of:

A. retrieving a first instruction (16) from the optimised sub data (8b), and

B. sending the first instruction (16) to the first client (5) for triggering an activity (17) of the first object (4), or C. sending the first instruction (16) to a second client (18) for triggering an activity (19) of a second object (20), wherein the second object (20) being related to the first object (4), or D. sending the first instruction (16) to a third client (21) for triggering an activity (22) of the first nearby object (9), or E. sending the first instruction (16) to a fourth client (23) for triggering an activity (24) of a second nearby object (25), wherein the second nearby object (25) being related to the first nearby object (9).

3. Method performed by a computer system (1) according to claim 2, wherein the method further comprises receiving a first behavioural data set (27a) describing a behaviour of the first object (4) from the first client (5) by means of a first behavioural device (28a) that is collecting information comprising real world activities of the first object (4) using the computer system (1) and being external to and in close proximity to or internal of the first object (4), and wherein the method further comprises receiving a second behavioural data set (27b) describing a behaviour of the second object (20) from the second client (18) by means of a second behavioural device (28b) that is collecting information comprising real world activities of the second object (20) using the computer system (1) and being external to and in close proximity to or internal of the second object (20).

4. Method performed by a computer system (1) according to claim 3, wherein the method further comprises the steps of:

A. retrieving a second instruction (29) from the optimised sub data (8b) as a response of the received first and second behavioural data set (27a, 27b) of the first and the second object (4, 20), and B. sending the second instruction (29) to the first client (5) for triggering an activity (17) of the first object (4), or C. sending the second instruction (29) to the second client (18) for triggering an activity (19) of the second object (20), wherein the second object (20) being related to the first object (4), or D. sending the second instruction (29) to the third client (21) for triggering an activity (22) of the first nearby object (9), or E. sending the second instruction (29) to the fourth client (23) for triggering an activity (22) of a second nearby object (25), wherein the second nearby object (25) being related to the first nearby object (9).

5. The method performed by a computer system (1) according to claim 3, wherein the behavioral device (28a, b) is a sensor configured to track a behavior of an object comprising movement, pace, and direction.

6. Method performed by a computer system (1) according to claim 2, wherein the computer system (1) is configured to communicate with a second database (2b), wherein the retrieving a data set (8) step comprises retrieving a first data set (8c) of the first nearby object (9) and the second nearby object (25) from the first database (2a) based upon the physical position (6a) of the location determining device (7), and retrieving a second data set (8d) of the first nearby object (9) and the second nearby object (25) from the second database (2b) based upon the physical position (6a) of the location determining device (7).

7. Method performed by a computer system (1) according to claim 1, wherein the method further comprises the step of sending and illustrating the final description of the surrounding environment (15) on a user interface (5a) of the first client (5).

8. Method performed by a computer system (1) according to claim 1, wherein the deleting redundant sub data step is conducted by using a geometric optimization model.

9. The method performed by a computer system (1) according to claim 8, wherein the geometric optimization model comprises a collision mesh model.

10. A computer system (1) for creation of augmented reality experiences and connection of these to the real world, wherein the computer system (1) is configured to communicate with a first database (2a) and configured to:

A. receive descriptive data (3) of a first object (4) from a first client (5), the descriptive data being metadata comprising the first object (4) and/or data describing a feature of the first object (4), B. receive a physical position (6a) of a location determining device (7) being external to and in close proximity to or internal of the first object (4), C. retrieve from the first database (2a) a data set (8) of a first nearby object (9) having a physical position (6b) in the surrounding environment (11) wherein the data set (8) is sourced from an application comprises one or more of a geographic information system (GIS), building information mapping (BIM), or business data (Bisnode), D. create a description of the surrounding environment (11) by combining: the retrieved data set (8) of the first nearby object (9) with the descriptive data (3) of the first object (4), the physical position (6a) retrieved by the location determining device (7), and the physical position (6b) of the first nearby object (9), E. delete redundant sub data (8a) of the retrieved data set (8) of the first nearby object (9) using a geometric optimization model creating an optimised sub data (8*b*), wherein the redundant sub data (8*a*) comprises all data of portions of the first nearby object (9) that the first object (4) does not visually observe in the real world, F. retrieve datasets of saliency data (13) of the first nearby object (9) from the first database (2*a*), wherein the saliency data (13) comprises data related to physical features or rendering aspects of the first nearby object (9), G. calculate a stand-out ratio (14) for the first nearby object (9) based on the saliency data (13), wherein the stand-out ratio is a value of how much the first nearby object (9) stands out in an overall illustration of the surrounding environment (11), and calculated based on the portion of the first nearby object (9) represents of the total line-of-sight-view, and H. create a final description of the surrounding environment (15) based on the descriptive data (3) of the first object (4), the physical position (6*a*) of the location determining device (7), the optimised sub data (8*b*), the stand-out ratio (14) for the first nearby object (9), and the physical position (6*b*) of the first nearby object (9), for providing the final description of the surrounding environment (15).

11. A non-transitory computer-readable medium storing a computer program including instructions that, which when run on a computer system for creation of augmented reality experiences and connection of these to the real world, causes the computer system to perform the method according to claim 1, wherein the computer system is configured to communicate with a first database (2*a*) and is arranged to:

A. receive descriptive data (3) of a first object (4) from a first client (5), B. receive a physical position (6*a*) of a location determining device (7) being external to and in close proximity to or internal of the first object (4), C. retrieve from the first database (2*a*) a data set (8) of a first nearby object (9) having a physical position (6*b*) in the environment, wherein the data set sourced from an application comprises one or more of geographic information system (GIS), building information mapping (BIM), or business data (Bisnode), D. create a description of the surrounding environment (11) by combining: the retrieved data set (8) of the first nearby object (9) with the descriptive data (3) of the first object (4), the physical position (6*a*) retrieved by the location determining device (7), and the physical position (6*b*) of the first nearby object (9), E. delete redundant sub data (8*a*) of the retrieved data set (8) of the first nearby object (9) using a geometric optimization model creating an optimised sub data (8*b*), wherein the redundant sub data (8*a*) comprises all data of portions of the first nearby object (9) that the first object (4) does not visually observe in the real world, F. retrieve datasets of saliency data (13) of the first nearby object (9) from the first database (2*a*), wherein the saliency data (13) comprises data related to physical features or rendering aspects of the first nearby object (9), G. calculate a stand-out ratio (14) for the first nearby object (9) based on the saliency data (13), wherein the stand-out ratio (14) is a value of how much the first nearby object (9) stands out in an overall illustration of the surrounding environment (11), and calculated based on the portion of the first nearby object (9) represents of the total line-of-sight-view, and H. create a final description of the surrounding environment (15) based on the descriptive data (3) of the first object (4), the physical position (6*a*) of the location determining device (7), the optimised sub data (8*b*), the stand-out ratio (14) for the first nearby object (9), and the physical position (6*b*) of the first nearby object (9), for providing the description of the surrounding environment (15).

* * * * *